(12) United States Patent
Xu et al.

(10) Patent No.: US 11,246,288 B2
(45) Date of Patent: Feb. 15, 2022

(54) INTELLIGENT OUTDOOR PET FEEDER

(71) Applicant: SHENZHEN LEBEN TECHNOLOGY CO., LTD., Shenzhen (CN)

(72) Inventors: Xun Xu, Shenzhen (CN); Zhiping Liu, Shenzhen (CN)

(73) Assignee: SHENZHEN LEBEN TECHNOLOGY CO., LTD., Shenzhen (CN)

( * ) Notice: Subject to any disclaimer, the term of this patent is extended or adjusted under 35 U.S.C. 154(b) by 175 days.

(21) Appl. No.: 16/807,130

(22) Filed: Mar. 2, 2020

(65) Prior Publication Data

US 2021/0204512 A1 Jul. 8, 2021

(30) Foreign Application Priority Data

Jan. 8, 2020 (CN) .......................... 202010018487.1

(51) Int. Cl.
*A01K 7/02* (2006.01)
(52) U.S. Cl.
CPC ..................................... *A01K 7/02* (2013.01)
(58) Field of Classification Search
CPC .......... A01K 7/02; A01K 7/022; A01K 7/025; A01K 7/00
See application file for complete search history.

(56) References Cited

U.S. PATENT DOCUMENTS

| | | | | |
|---|---|---|---|---|
| 5,433,171 A | * | 7/1995 | Ewell | A01K 5/0291 |
| | | | | 119/51.5 |
| 2006/0174838 A1 | * | 8/2006 | Plante | A01K 7/02 |
| | | | | 119/74 |
| 2020/0100462 A1 | * | 4/2020 | Chen | A01K 7/02 |

FOREIGN PATENT DOCUMENTS

| | | | | | |
|---|---|---|---|---|---|
| DE | 3032901 A | * | 8/1982 | | A01K 7/02 |
| EP | 3626065 A1 | * | 3/2020 | | A01K 7/025 |
| KR | 200435135 Y1 | * | 1/2007 | | A01K 13/003 |
| WO | WO-2018015002 A1 | * | 1/2018 | | G05D 16/2086 |

* cited by examiner

*Primary Examiner* — Kristen C Hayes

(57) ABSTRACT

An intelligent outdoor pet feeder includes an outer shell, a bottom shell, a water storage module, a control module, a water adding module, a biological sensing module, a water volume sensing module, and a power supply module. The water storage module is disposed inside the outer shell, the biological sensing module is disposed on the outer shell, the water adding module is disposed inside the outer shell, the control module is disposed inside the outer shell, and the water volume sensing module is disposed inside the water storage module. The intelligent outdoor pet feeder identifiers the pet body by the biological sensing module, identifies a change of water volume inside the water storage device combining with the water volume sensing module, and further controls operation of adding water of the water adding module.

7 Claims, 5 Drawing Sheets

INTELLIGENT OUTDOOR PET FEEDER

TECHNICAL FIELD

The present disclosure relates to a pet feeder, in particular to an intelligent outdoor pet feeder.

BACKGROUND

As people's living standards constantly improve, raising pets has become a fashion trend of modern people. However, drinking water for pet must be solved when people are raising pets, especially when pets are kept outdoors. Thus, a wide variety of pet drinking devices have been developed on the markets.

One type of pet drinking device on the market is an integrated one where a water containing basin of the pet drinking device and a base of the pet drinking device are integrated together. Because these pet drinking devices are placed outdoors, the containing basins are easy to become dirty and breed bacteria and moss, so that the containing basins require to be frequently cleaned. Moreover, the pet drinking devices usually require pet owners to timely add clean water. There is another type of the pet drinking devices, which pre-stores clear water by a large water storage device. When a water level in the water containing basin decreases, the water storage device adds clear water into the water containing basin, so that volume of the clear water in the water containing basin is always kept in balance. And also because the water containing basins are placed outdoors, the water containing basins are easy to become dirty.

The water contained in the two types of the pet drinking devices described above are easily contaminated and the water containing basins are difficult to clean. Moreover, because the clear water is always pre-added, the clear water cannot be kept fresh for a long time. Thus, the clear water is required to be frequently replaced, which is extremely inconvenient.

SUMMARY

The present disclosure aims at providing an intelligent outdoor pet feeder which can provide fresh drinking water to a pet anytime.

In order to reach aims above, the present disclosure provides the intelligent outdoor pet feeder, which includes an outer shell and a bottom shell. The outer shell is disposed on the bottom shell. The intelligent outdoor pet feeder further includes a water storage module, a control module, a water adding module electrically connected with the control module, a biological sensing module, a water volume sensing module, and a power supply module. The water storage module is disposed inside the outer shell, the biological sensing module is disposed on the outer shell, the water adding module is disposed inside the outer shell, the control module is disposed inside the outer shell, and the water volume sensing module is disposed inside the water storage module. The control module is a control mainboard. The water volume sensing module includes a tray, a spring, a first induction spring contact, a second induction spring contact, and a third induction spring contact. The first induction spring contact, the second induction spring contact, and the third induction spring contact are electrically connected with the control mainboard. The first induction spring contact and the second induction spring contact are disposed on the tray, the tray is fixedly connected with one end of the spring, and a through hole is further formed on the tray. The third induction spring contact is fixed on the water storage module, and an installation position of the through hole matches with an installation position of the third induction spring contact.

Furthermore, a protective shell of the pet feeder is formed of the outer shell and the bottom shell. The water storage module is configured to contain water. The control mainboard is a control device of the pet feeder, the control mainboard is a single chip microcomputer, and can also be a controller which recognizes sensor signals and controls motion of other devices. The water adding module injects the water into a water storage device. The biological sensing module senses whether the pet is close to or stands near the pet feeder. The power supply module provides electric energy for the pet feeder.

The water volume sensing module identifies water volume inside the water storage device. The first induction spring contact, the second induction spring contact, and the water storage device form a closed-circuit loop, and an electric signal is sent to the control mainboard, so that whether the water storage device is placed on the tray is identified. The spring is configured to support the tray. The third induction spring contact passes through the through hole on the tray and forms a closed-circuit loop with the first induction spring contact and the water storage device, and the electric signal is sent to the control mainboard, so that whether the water volume inside the water storage device is enough is identified.

Furthermore, the water storage module includes an inner shell and the water storage device made of metal materials. The inner shell is disposed inside the outer shell, and the water storage device is placed inside the inner shell.

The inner shell is configured to support the water storage device, and the water storage device is configured to contain pet drinking water. The water storage device is made of the metal materials, so that the water storage device can conduct electricity.

Furthermore, the water volume sensing module is disposed between the water storage device and the inner shell. The tray is disposed under the water storage device. The third induction spring contact is fixed inside the inner shell, and another end of the spring is fixedly connected with the inner shell.

The water volume sensing module is disposed inside space formed between the water storage device and the inner shell, which identifies whether the water storage device is placed inside the inner shell and detects whether the water volume inside the water storage device is enough for the pet to drink.

Furthermore, the water adding module is disposed inside the outer shell, and the water adding module includes a water adding assembly, a pipe joint and a solenoid valve. The water adding assembly includes a connecting pipe and a flow guiding flat pipe, one end of the pipe joint is disposed on a feeding end of the solenoid valve, and another end of the pipe joint passes through an installing hole disposed on the outer shell. A discharging end of the solenoid valve is connected with one end of the connecting pipe, and another end of the connecting pipe is connected with the flow guiding flat pipe. A discharging end of the flow guiding flat pipe is located above the water storage device.

The pipe joint passes through passes through the installing hole disposed on the outer shell, and then not only connects with the water storage device but also connected with water by a pipeline. The solenoid valve is electrically connected with the control mainboard and is configured to control the pet feeder to begin adding water or stop adding water. The connecting pipe is configured to drain the water to the flow guiding flat pipe, and the flow guiding flat pipe is configured to guide the water into the water storage device. The connecting pipe is connected with the flow guiding flat pipe at a certain connecting angle, and the connecting angle can be ninety degrees, which prevents water sprayed from the connecting pipe from directly spraying out of the pet feeder from the discharging end of the flow guiding flat pipe and make sure that surrounding environment of the pet feeder keeps refreshing and drying. Moreover, a water flow area of the flow guiding flat pipe is larger than a water flow area of the connecting pipe, so that the flow guiding flat pipe converts large water flow pressure in the connecting pipe into smaller water flow pressure.

Furthermore, the power supply module includes a battery compartment, a battery support, a dry battery, a sealing ring, and a battery compartment cover. The battery compartment is disposed on the bottom shell, the battery compartment is electrically connected with the control mainboard, the dry battery is disposed inside the battery compartment, and the battery support configure to limit a position of the dry battery is further disposed inside the batter compartment. The battery compartment cover is buckled with the battery compartment, and the sealing ring is disposed on where the battery compartment cover contacting the battery compartment.

Moreover, the power supply module can be replaced with a power cord to be directly connected with an external power source. The dry battery is configured to a power supply of the pet feeder, which is conveniently for the pet feeder to move and does not limit a placement position of the pet feeder. The battery compartment is configured to contain the dry battery, the battery support is configured to limit a position of the dry battery inside the battery compartment, the battery compartment cover is configured to fix the dry battery inside the battery compartment. The sealing ring is configured to seal a gap between the battery compartment cover and the battery compartment, so that the water is prevented from entering the battery compartment to cause a short circuit of the dry battery.

Furthermore, the biological sensing module is an inductor, and the inductor is an infrared heat source sensor.

The inductor senses heat source infrared ray emitted by a pet body, and then identifies whether the pet body is located near the pet feeder and requires drinking water. The inductor can be other sensors which can sense living bodies.

Furthermore, an indicator light is further disposed on a top of the outer shell, and the indicator light is electrically connected with the control mainboard.

The indicator light is configured to indicate a working state of the pet feeder. For example, the indicator light flashes when the water adding module adds the water.

Working principles and advantages of the present disclosure are followings: The intelligent outdoor pet feeder identifies the pet body by the biological sensing module, identifies water volume change inside the water storage device combining with the water volume sensing module, and further controls operation of adding water of the water adding module. The intelligent outdoor pet feeder automatically control adding water volume according to the amount that a pet drinks, so that manual operation is not required, which greatly reduces labor of pet owners. Thus, the pet drinks fresh clean water at any time, meanwhile, the water storage device can be separated from the intelligent outdoor pet feeder, which convenient for the pet owners to clean.

DETAILED DESCRIPTION

Figure 1:
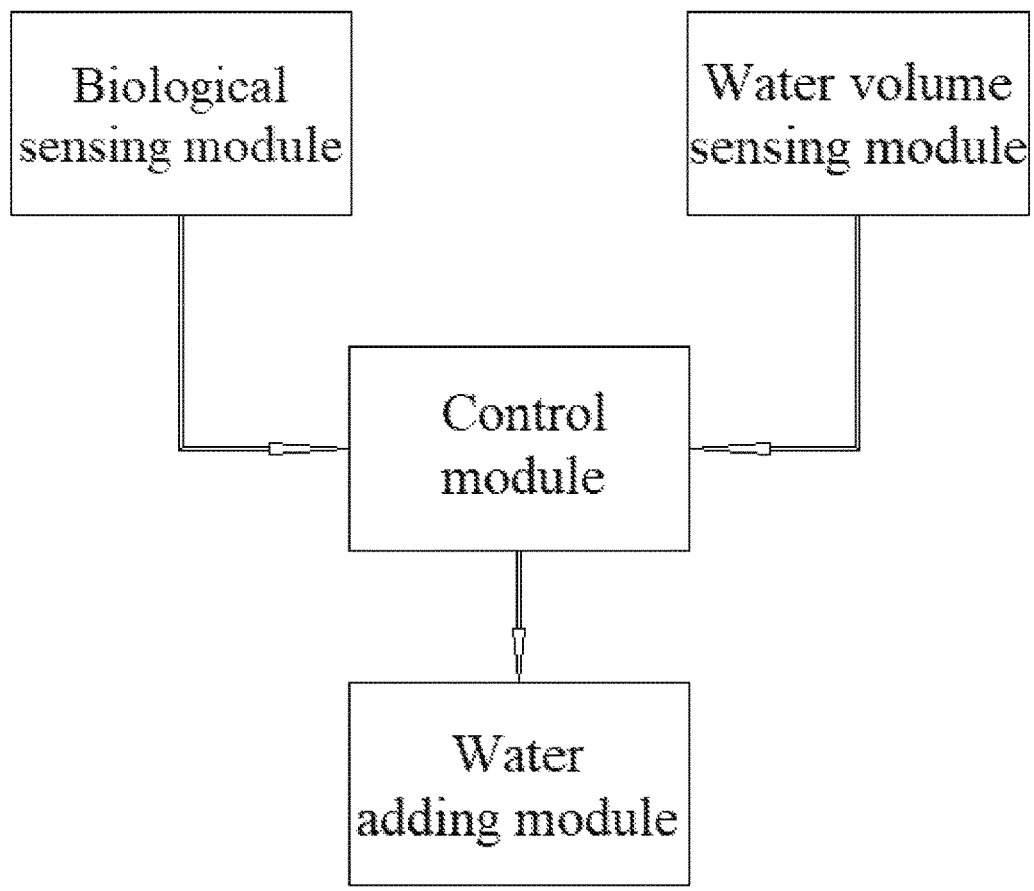
FIG. 1 is a working logic block diagram of a pet feeder of the present disclosure.

Detailed description of the present disclosure are described below according to embodiments.

Reference numerals in the drawings include:

1. water storage device; 2. outer shell; 3. inner shell; 4. bottom shell; 5. control mainboard; 6. inductor; 7. indicator light; 8. installing hole; 9. water adding assembly; 10. pipe joint; 11. solenoid valve; 12. battery compartment; 13. battery support; 14. dry battery; 15. first induction spring contact; 16. second induction spring contact; 17. tray; 18. through hole; 19. spring; 20. third induction spring contact; 21. sealing ring; 22. battery compartment cover.

The specific implementation procedure is as follows:

As shown in FIGS. 1-4, the present disclosure provides an intelligent outdoor pet feeder, including an outer shell 2 and a bottom shell 4, where the outer shell 2 is disposed on the bottom shell 4. The intelligent outdoor pet feeder further includes a water storage module, a control module, a water adding module electrically connected with the control module, a biological sensing module, a water volume sensing module, and a power supply module. The water storage module is disposed inside the outer shell 2, the biological sensing module is disposed on the outer shell 2, the water adding module is disposed inside the outer shell 2, the control module is disposed inside the outer shell 2, and the water volume sensing module is disposed inside the water storage module. The control module is a control mainboard 5. The water volume sensing module comprises a tray 17, a spring 19, a first induction spring contact 15, a second induction spring contact 16, and a third induction spring contact 20. The first induction spring contact 15, the second induction spring contact 16, and the third induction spring contact 20 are electrically connected with the control mainboard 5. The first induction spring contact 15 and the second induction spring contact 16 are disposed on the tray 17. The tray 17 is fixedly connected with one end of the spring 19, and a through hole 18 is further formed on the tray 17. The third induction spring contact 20 is fixed on the water storage module, and an installation position of the through hole 18 matches with an installation position of the third induction spring contact 20.

Figure 3:
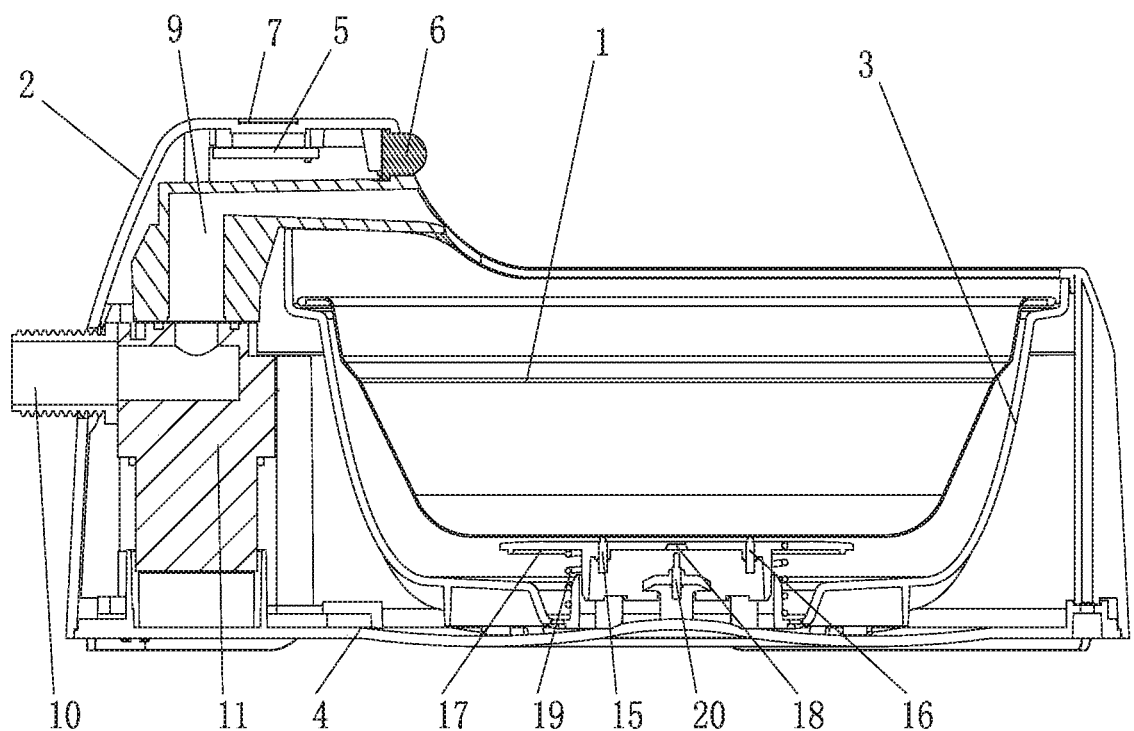
FIG. 3 is a cross-sectional diagram of the pet feeder of the present disclosure.
Figure 4:
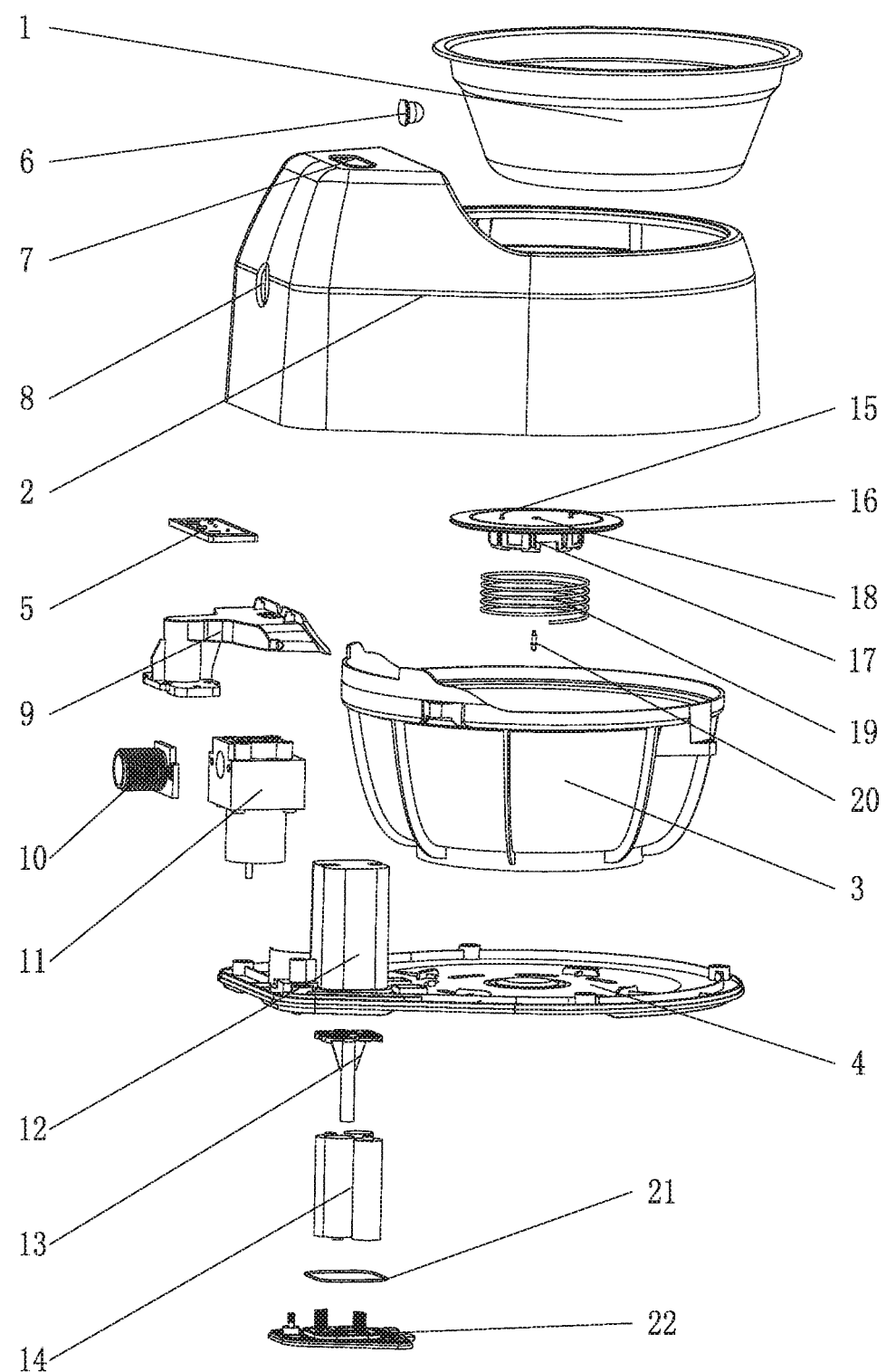
FIG. 4 is an explosion diagram of the pet feeder of the present disclosure

As shown in FIG. 3, the power supply module includes a battery compartment 12, a battery support 13, a dry battery 14, a sealing ring 21, and a battery compartment cover 22. The battery compartment 12 is disposed on the bottom shell 4, the battery compartment 12 is electrically connected with the control mainboard 5, the dry battery 14 is disposed inside the battery compartment 12, and the battery support 13 configure to limit a position of the dry battery 14 is further disposed inside the batter compartment 12. The battery compartment cover 22 is buckled with the battery compartment 12, and the sealing ring is disposed on where the battery compartment cover 22 contacting the battery compartment 12.

When the intelligent outdoor pet feeder is used, the dry battery 14 is first placed in battery compartment 12 disposed on bottom shell 4, where the battery support 13 limits the position of each dry battery. Then the sealing ring 21 is disposed on the battery compartment 12, the battery compartment cover 22 covers the battery compartment 12, and the dry battery 14 is sealed inside the battery compartment 12. And then the water is conducted to the water adding module by the pipeline, so that the pet feeder can be placed in a suitable place. The protective shell is formed by the outer shell 2 and the bottom shell 4 to protect each functional module.

The biological sensing module is an inductor 6, and the inductor 6 is an infrared heat source sensor.

When the pet is close to the intelligent outdoor pet feeder, the inductor 6, that is, the infrared heat source sensor, senses that the pet stands in a certain range of the pet feeder and transmits corresponding signals back to the control mainboard 5.

Figure 2:
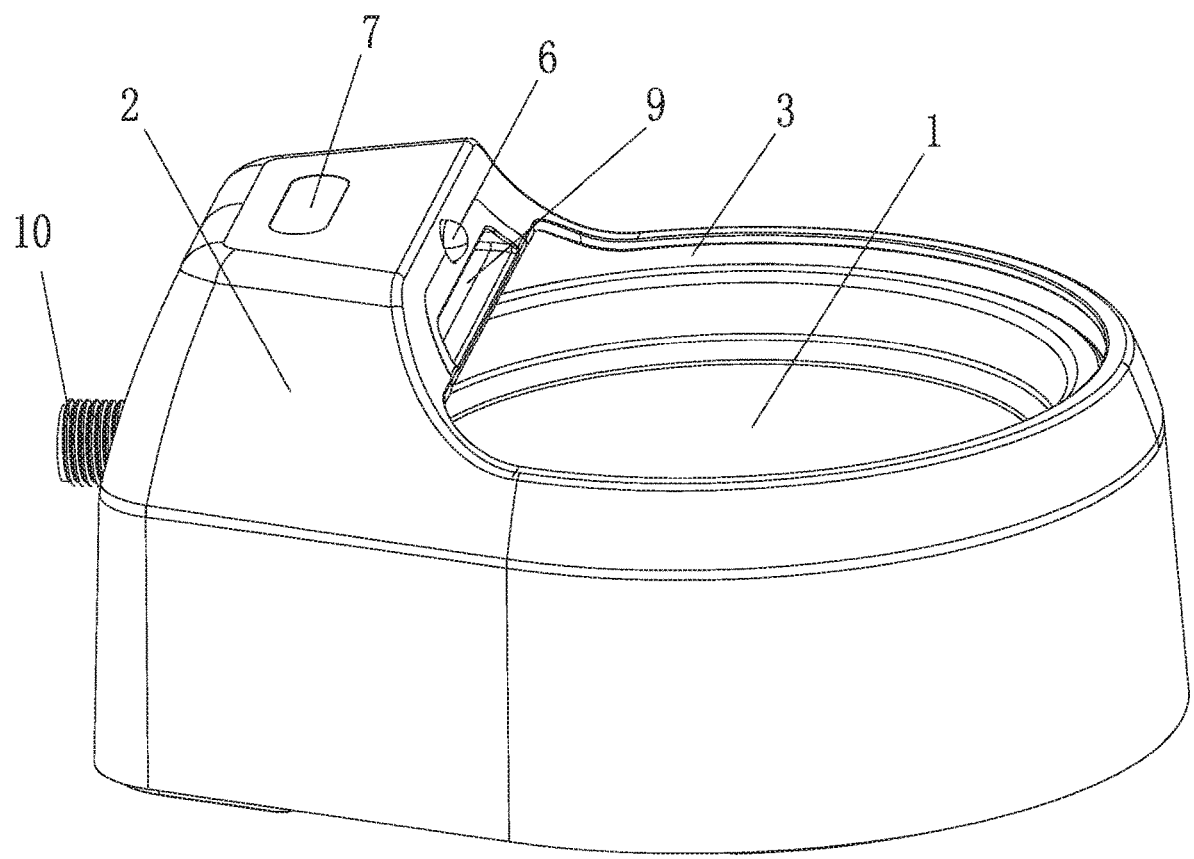
FIG. 2 is a perspective diagram of the pet feeder of the present disclosure.

As shown in FIG. 2, the water storage module includes the inner shell 3 and the water storage device 1 made of metal materials. The inner shell 3 is disposed inside the outer shell 2, and the water storage device 1 is placed inside the inner shell 3.

The intelligent outdoor pet feeder does not work if the water storage device 1 of the water storage module is located on the tray 17 disposed inside the inner shell 3 is not sensed by the water volume sensing module. When the water storage device 1 is located on the tray 17 disposed inside the inner shell 3, the water storage device 1 is pressed on the first induction spring contact 15 and the second induction spring contact 16. The first induction spring contact 15, the second induction spring contact 16, and the water storage device 1 form a closed-circuit loop, then an electric signal is sent to the control mainboard 5. The control mainboard 5 cooperates with the inductor 6 to identify a signal of a pet body, then the control mainboard 5 controls the water adding module to operate.

Figure 5:
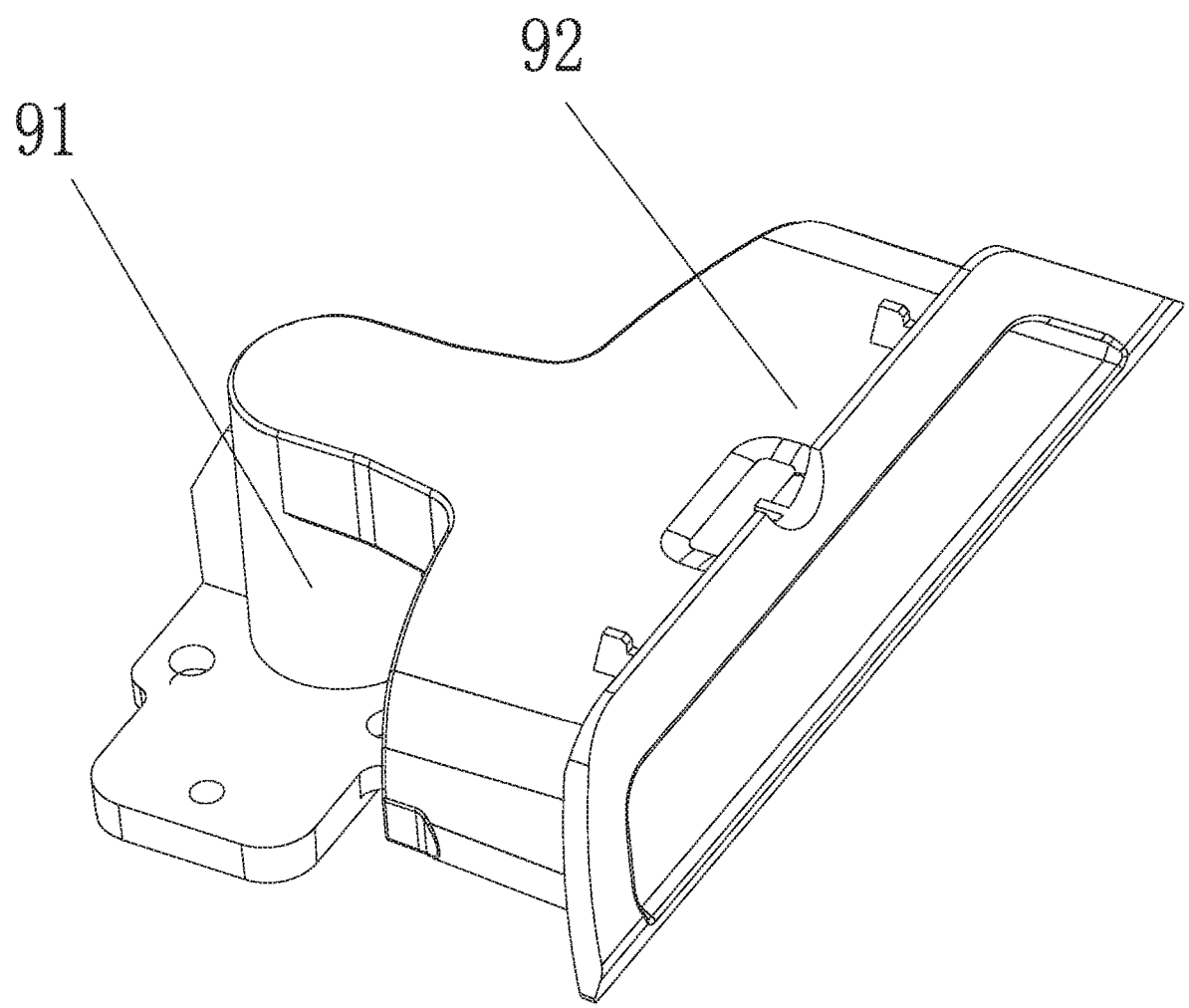
FIG. 5 is a schematic structural diagram of a water adding assembly of the pet feeder present disclosure.

As shown in FIG. 5, the water adding module is disposed inside the outer shell 2, and the water adding module includes a water adding assembly 9, a pipe joint 10 and a solenoid valve 11. The water adding assembly 9 includes a connecting pipe 91 and a flow guiding flat pipe 92. One end of the pipe joint 10 is disposed on a feeding end of the solenoid valve 11, and another end of the pipe joint 10 passes through an installing hole 8 disposed on the outer shell 2. A discharging end of the solenoid valve 11 is connected with one end of the connecting pipe 91, and another end of the connecting pipe 91 is connected with the flow guiding flat pipe 92. A discharging end of the flow guiding flat pipe is located above the water storage device 1.

When the control mainboard 5 controls the water adding module to operate, the control mainboard 5 further controls the passage of the solenoid valve 11. The water is guided into the solenoid valve 11 from the faucet through the pipeline and the pipe joint 10, and enters the water adding assembly 9 after coming out of the solenoid valve 11. And then the water sprays from the connecting pipe 91 of the water adding assembly 9 to the flow guiding flat pipe 92 and flows into the water storage device 1 by pressure relief and guide of the flow guiding flat pipe 92, which prevents the water from spraying to an area besides the water storage device 1. The installing hole 8 disposed on the outer shell 2 is convenient for the pipe joint 10 to connect with a water pipe.

An indicator light 7 is further disposed on a top of the outer shell 2, and the indicator light 7 is electrically connected with the control mainboard 5.

When the water adding module works, the control mainboard 5 controls the indicator light 7 to work, which means the intelligent outdoor pet feeder is adding water.

As shown in FIG. 3, the water volume sensing module is disposed between the water storage device 1 and the inner shell 3. The tray 17 is disposed under the water storage device 1. The third induction spring contact 20 is fixed inside the inner shell 3, and another end of the spring 19 is fixedly connected with the inner shell 3.

When the water volume in the water storage device 1 reaches a certain amount, due to gravity of water, the water storage device 1 moves downward. The water storage device 1 presses the tray 17 down, then the tray 17 compresses the spring 19, so that the third induction spring contact 20 disposed inside the inner shell 3 passes through the through hole 18 disposed on the tray 17 and contacts with the water storage device 1. The third induction spring contact 20, the water storage device 1, and the first induction spring contact 15 forms the closed-circuit loop, then the electric signal is sent to the control mainboard 5. The control mainboard 5 receives the electric signal and controls the solenoid valve 11 to break circuit, so that the water adding module stops adding the water to the water storage module 1. When the pet consumes the water to a certain degree, the third induction spring contact 20 is separated from the water storage device 1. When water adding condition of the water adding module described above is met, the water adding module continues to add the water into the water storage device 1. When the pet leaves far away from the pet feeder, the inductor 6 can not sense the pet body, the control mainboard 5 also controls the water adding module to stop adding water into the water storage device 1.

Working principles and advantages of the present disclosure are as followings: The intelligent outdoor pet feeder identifies the pet body by the biological sensing module, identifies water volume change inside the water storage device combining with the water volume sensing module, and further controls operation of adding water of the water adding module. The intelligent outdoor pet feeder automatically controls adding water volume according to the amount that a pet drinks, so that manual operation is not required, which greatly reduces labor of pet owners. Thus, the pet drinks fresh clean water at any time. Meanwhile, the water storage device can be separated from the intelligent outdoor pet feeder, which convenient for the pet owners to clean.

The foregoing is merely an embodiment of the present disclosure. The specific structures and characteristics that are well known in the art, and the like, of this embodiment, are not described in detail herein. It will be appreciated by those of ordinary skill in the art that prior to the filing date or priority of the present application, all of the ordinary skill in the art can know all of the prior art in this field and have the ability to apply the conventional experimental means before the date, and one of ordinary skill in the art can refine and implement the present scheme in conjunction with its own capabilities in light of the teachings presented herein. Some typical well-known structures or well-known methods should not be an obstacle to practicing the present disclosure by one of ordinary skill in the art. It should be noted that several variations and modifications may be made to those skilled in the art without departing from the structure of the present disclosure, which should also be taken as the scope of protection of the present disclosure and do not affect the effectiveness and applicability of the practice of the invention. The scope of the invention should be set forth with reference to the claims, rather than the foregoing description of specific embodiments, which may be used to explain the contents of the claims.

What is claimed is:

1. An intelligent outdoor pet feeder, comprising an outer shell (2) and a bottom shell (4), wherein the outer shell (2) is disposed on the bottom shell (4); the intelligent outdoor pet feeder further comprises a water storage module, a control module, a water adding module electrically connected with the control module, a biological sensing module, a water volume sensing module, and a power supply module; wherein the water storage module is disposed inside the outer shell (2), the biological sensing module is disposed on the outer shell (2), the water adding module is disposed inside the outer shell (2), the control module is disposed inside the outer shell (2), and the water volume sensing module is disposed inside the water storage module; the control module is a control mainboard (5); the water volume sensing module comprises a tray (17), a spring (19), a first induction spring contact (15), a second induction spring contact (16), and a third induction spring contact (20); the first induction spring contact (15), the second induction spring contact (16), and the third induction spring contact (20) are electrically connected with the control mainboard (5); the first induction spring contact (15) and the second induction spring contact (16) are disposed on the tray (17), the tray (17) is fixedly connected with one end of the spring (19), and a through hole (18) is further formed on the tray (17); the third induction spring contact (20) is fixed on the water storage module, and an installation position of the through hole (18) matches with an installation position of the third induction spring contact (20).

2. The intelligent outdoor pet feeder according to claim 1, wherein the water storage module comprises an inner shell (3) and a water storage device (1) made of metal materials; the inner shell (3) is disposed inside the outer shell (2); and the water storage device (1) is placed inside the inner shell (3).

3. The intelligent outdoor pet feeder according to claim 2, wherein the water volume sensing module is disposed between the water storage device (1) and the inner shell (3); the tray (17) is disposed under the water storage device (1); the third induction spring contact (20) is fixed inside the inner shell (3); and another end of the spring (19) is fixedly connected with the inner shell (3).

4. The intelligent outdoor pet feeder according to claim 1, wherein the water adding module is disposed inside the outer shell (2), and the water adding module comprises a water adding assembly (9), a pipe joint (10) and a solenoid valve (11); the water adding assembly (9) comprises a connecting pipe (91) and a flow guiding flat pipe (92); one end of the pipe joint (10) is disposed on a feeding end of the solenoid valve (11), and another end of the pipe joint (10) passes through an installing hole (8) disposed on the outer shell (2); a discharging end of the solenoid valve (11) is connected with one end of the connecting pipe (91), and another end of the connecting pipe (91) is connected with the flow guiding flat pipe (92); a discharging end of the flow guiding flat pipe is located above the water storage device (1).

5. The intelligent outdoor pet feeder according to claim 1, wherein the power supply module comprises a battery compartment (12), a battery support (13), a dry battery (14), a sealing ring (21), and a battery compartment cover (22); the battery compartment (12) is disposed on the bottom shell (4), the battery compartment (12) is electrically connected with the control mainboard (5), the dry battery (14) is disposed inside the battery compartment (12), and the battery support (13) configure to limit a position of the dry battery (14) is further disposed inside the batter compartment (12); the battery compartment cover (22) is buckled with the battery compartment (12), and the sealing ring is disposed on where the battery compartment cover (22) contacting the battery compartment (12).

6. The intelligent outdoor pet feeder according to claim 1, wherein the biological sensing module is an inductor (6), and the inductor (6) is an infrared heat source sensor.

7. The intelligent outdoor pet feeder according to claim 1, wherein an indicator light (7) is further disposed on a top of the outer shell (2), and the indicator light (7) is electrically connected with the control mainboard (5).

* * * * *